United States Patent Office.

JOHN H. WOOLRICH, OF WOBURN, MASSACHUSETTS.

Letters Patent No. 104,094, dated June 7, 1870.

IMPROVEMENT IN CONDITION-POWDERS FOR HORSES AND CATTLE.

The Schedule referred to in these Letters Patent and making part of the same.

To all whom it may concern:

Be it known that I, JOHN H. WOOLRICH, of Woburn, in the county of Middlesex and State of Massachusetts, have invented a new and useful Improvement in Condition-Powders; and I do hereby declare that the following is a full, clear, and exact description thereof, which will enable others skilled in the art to make and use the same.

The present invention relates to a new article of trade in the form of a powder composed of several materials to be hereinafter recited, which article or powder is denominated "Arabian food" or "spice," and is intended by me for use in connection with the ordinary feed of horses, cattle, sheep, pigs, calves, and other domestic animals, by mixing or combining it therewith, for the purposes more especially of imparting a relish thereto, and increasing the appetite of the animals, and of assisting the digestion of the feed by their digestive organs.

In its use as aforesaid, it is the most advantageous, decisive, and important in its action and operation, with horses and cattle, &c., in inclement and wintry weather, when housed, serving, at such times, as a substitute for the trefoil, sweet caraway, juniper, and other tonic herbs or "nature's medicaments," which, at other seasons or times of the year are free to and diligently sought after by them, whereby are prevented, at such times, loss of strength and flesh, flatulency, and colic, and in many instances death from diseases which, were they in a weak condition, they would be liable to contract.

In experimenting to produce a powder or "Arabian food" having the requisite qualities as a whole to secure the benefits and effects above recited by its use as aforesaid, it was found necessary to combine with the active medicinal ingredients or agent employed, materials to absorb the flavor thereof, and to impart to the powder an agreeable and pleasant taste and smell; or, otherwise, when given to horses, &c., in their ordinary feed, they would not eat it.

And in the powder embraced by this invention, a combination of materials is employed, containing in themselves, as a whole, not only the requisite medicinal qualities, but the absorbents and the flavors necessary to render the medicinal ingredients palatable to horses, &c., when the powder is mixed with the ordinary feed for them, the powder consisting of the following ingredients mixed together in or about the proportions stated, viz:

Linseed meal, thirty-five (35) pounds.
Corn meal, thirty-five (35) pounds.
Caraway-seeds, ground, two and one-half (2½) pounds.
Anise-seeds, ground, three and one-half (3½) pounds.
Cumin-seeds, ground, one and one-half (1½) pounds.
Gentian-root, ground, two and one-half (2½) pounds.
Black antimony, three and one-half (3½) pounds.
Nitrate of potash, seven (7) pounds.
Sugar, ten (10) pounds.
Coriander-seeds, ground, one and one-half (1½) pounds.
Fenugreek-seeds, ground, three (3) pounds.
Bole Armenian, one and one-half (1½) pounds.
Sulphur, three and one-half (3½) pounds.
Ginger, one (1) pound.

In the above-recited ingredients it will be obvious that there are combined those possessing medicinal, absorbing, and flavoring properties; the seeds of caraway, anise, cumim, fenugreek, and gentian-root, black antimony, nitrate of potash, sulphur, ginger, and bole Armenian being medicinal, and in some instances absorbing and flavoring, and the meals of linseed and corn, as well as the sugar and coriander-seed, both absorbing and flavering.

I am well aware that in veterinary medicines, most, if not all of the ingredients composing this Arabian food are used, some in one medicine or prescription, and some in another, but in no case heretofore have they been all combined in one compound, embracing in it, as a whole, medicinal, absorbing, and flavoring qualities, the powder embraced in this invention being to the feed of animals what relishes are to the food of man.

In using my Arabian food for a horse, cow, or ox, mix one table-spoonful of it with the food in the manger, adding a little water to dampen the whole.

For a calf about one-third of a table-spoonful mixed with the milk required, will answer, it being desirable to first moisten the powder.

For a pig, use one-half of a spoonful of the powder with his food, moistening the powder before mixing.

For sheep, one table-spoonful of the powder with chopped hay, turnips, &c., will be sufficient for three.

It may be here remarked that in addition to the many advantages heretofore enumerated as secured by my improved powder compound, its use will give life, vigor, and energy to horses and other animals, and also brilliancy to their eyes, and in many other respects benefit their condition and health.

Having thus described my "Arabian food," so termed, What I claim as my invention, and desire to have secured to me by Letters Patent, is—.

A powder composed of the several ingredients possessing medicinal absorbing and flavoring qualities, substantially as and for the purpose described.

The above specification of my invention signed by me this 12th day of October, 1869.

J. H. WOOLRICH.

Witnesses:
H. N. TAFT,
GEO. W. MABEE,